United States Patent
De Schrijver et al.

(10) Patent No.: US 10,372,370 B2
(45) Date of Patent: Aug. 6, 2019

(54) METADATA LOAD DISTRIBUTION MANAGEMENT

(71) Applicant: Western Digital Technologies, Inc., San Jose, CA (US)

(72) Inventors: Frederik Jacqueline Luc De Schrijver, Wenduine (BE); Lien Joke Boelaert, Nevele (BE); Joris Custers, Ghent (BE); Carl Rene D'Halluin, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 134 days.

(21) Appl. No.: 15/629,497

(22) Filed: Jun. 21, 2017

(65) Prior Publication Data
US 2018/0373456 A1     Dec. 27, 2018

(51) Int. Cl.
*G06F 12/00* (2006.01)
*G06F 3/06* (2006.01)

(52) U.S. Cl.
CPC ............ *G06F 3/0647* (2013.01); *G06F 3/061* (2013.01); *G06F 3/067* (2013.01); *G06F 3/0611* (2013.01); *G06F 3/0646* (2013.01)

(58) Field of Classification Search
CPC ......... G06F 3/0647; G06F 3/061; G06F 3/067
See application file for complete search history.

(56) References Cited

U.S. PATENT DOCUMENTS

| 7,373,477 | B2 | 5/2008 | Takase et al. |
|---|---|---|---|
| 7,873,619 | B1 | 1/2011 | Faibish et al. |
| 8,886,781 | B2 | 11/2014 | Jain et al. |
| 2011/0246503 | A1* | 10/2011 | Bender ............ G06F 17/30306 707/769 |

(Continued)

FOREIGN PATENT DOCUMENTS

| CN | 101957861 A | 1/2011 |
|---|---|---|
| CN | 102523258 A | 6/2012 |

(Continued)

OTHER PUBLICATIONS

Zhang et al., WLBS: A Weight-based Metadata Server Cluster Load Balancing Strategy, International Journal of Advancements in Computing Technology, Jan. 2012, pp. 77-85, vol. 4 No. 1.

(Continued)

*Primary Examiner* — David Yi
*Assistant Examiner* — Tahilba O Puche
(74) *Attorney, Agent, or Firm* — Patent Law Works LLP

(57) ABSTRACT

A computer-implemented method for redistributing data between memory clusters in a key value store. The data is redistributed according to a load balancing algorithm. Memory clusters are sorted into lists according to the number of intervals each cluster contains. Migration jobs are created by the load balancing algorithm to push data fragments from a larger cluster to a smaller cluster. Data fragments, or intervals, are selected for migration according to corresponding data fragments on a target cluster or the number of occupying data fragments on a target cluster. The (Continued)

redistribution of data helps avoid fragmentation of key ranges of intervals, decrease the overall number of non-adjacent key ranges, and to conform to the routing table requirements.

20 Claims, 9 Drawing Sheets

(56) References Cited

U.S. PATENT DOCUMENTS

| | | | | |
|---|---|---|---|---|
| 2012/0254175 | A1* | 10/2012 | Horowitz | G06F 17/30584 |
| | | | | 707/737 |
| 2013/0290249 | A1 | 10/2013 | Merriman et al. | |
| 2013/0332608 | A1* | 12/2013 | Shiga | G06F 9/5088 |
| | | | | 709/226 |

FOREIGN PATENT DOCUMENTS

| | | |
|---|---|---|
| CN | 103763365 A | 4/2014 |
| CN | 102523158 B | 7/2014 |
| CN | 104580536 A | 4/2015 |

OTHER PUBLICATIONS

Sevilla et al., Mantle: A Programmable Metadata Load Balancer for Ceph File System, found at <https://www.soe.ucsc.edu/sites/default/files/technical-reports/UCSC-SOE-15-10.pdf>, downloaded on Mar. 8, 2016, 12 pages.

PCT International Search Report and Written Opinion, Application No. PCT/US2018/020805, dated May 17, 2018.

\* cited by examiner

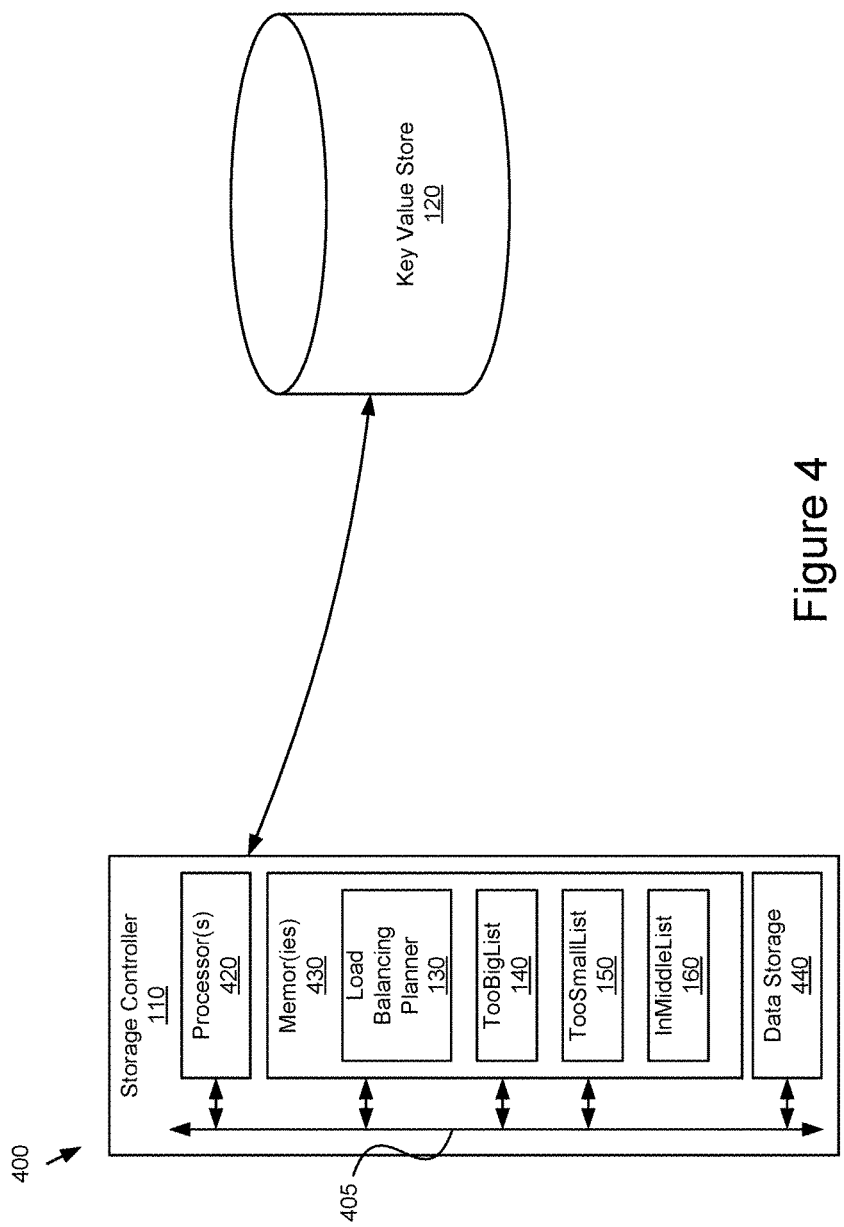

US 10,372,370 B2

METADATA LOAD DISTRIBUTION MANAGEMENT

FIELD OF THE INVENTION

The present disclosure generally relates to the load balancing of data fragments among a group of clusters in a storage system. In particular, the present disclosure relates to a load balancing algorithm that sorts and redistributes clusters according to the data fragments that are contained therein.

BACKGROUND

Uneven distribution of data becomes problematic with storage capacity increases, frequent changes of data, and a limited routing table. This problem has been addressed in part by recommending subtree migrations between metadata servers or analysing latency of queries. Although methods for load distributing exist, existing techniques suffer from one or more disadvantages.

In particular, metadata stores provide information about a collection of data. Typically, metadata servers contain data organized in mapped files and directories that enable the discovering of relevant information. This data dynamically changes in a metadata store as contents and references are added, removed, or restructured. These changes disturb the efficiency and performance of the metadata store, possibly resulting in overloading certain memory clusters. Failure to implement a load balancing strategy to downsize the certain memory clusters in the metadata store leads to a potential performance bottleneck due to uneven distribution of data.

SUMMARY

The techniques introduced in the present disclosure are particularly advantageous because they automate the balancing of data loads across memory clusters in a storage system (e.g., a sharded metadata store). Disclosed herein are techniques that balance the number of data fragments, or intervals, that are contained within memory clusters by migrating data fragments among different memory clusters. The techniques further include sorting memory clusters into a set of lists. Based on the set of lists, the techniques include determining which memory clusters should be removed or added. The techniques further include redistributing data fragments from a first memory cluster to a second memory cluster according to the position of the clusters within the set of lists. In this manner, intervals of data fragments are redistributed throughout the storage system to ensure well balanced clusters.

The techniques include sorting clusters into lists based upon the number of intervals each cluster contains. For example, clusters may be sorted into a list from which intervals of data fragments should be removed (e.g., if the number of data fragments is above a threshold) and another list to which intervals of data fragments should be added (e.g., if the number of data fragments is below a threshold). The techniques introduced herein include a load distributing algorithm to redistribute the intervals within clusters based on which list the clusters fall in. More lists may be created depending on the demand to downsize a cluster.

In one embodiment, the load balancing algorithm is used to determine when and how the intervals of data fragments are redistributed across clusters to ensure the clusters are properly sorted. Based on the load balancing algorithm, a migration job is created to move an interval of data fragments between a source cluster and a target cluster. The load balancing algorithm matches the interval of data fragments to the target cluster depending on the data fragment key ranges within the target cluster or the number of intervals of data fragments within the target cluster. Once the interval of data fragments is migrated from the source cluster to the target cluster, the source and target clusters may be removed from their respective lists based on the number of data fragments remaining in the clusters.

Advantageously, applying the load balancing technique to a storage system avoids fragmentation of data fragment key ranges, decreases the overall number of non-adjacent data fragment key ranges, and conforms the storage system to routing table requirements.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 4 is a block diagram illustrating an embodiment of a system for implementing the load distribution management according to the techniques described herein.

DETAILED DESCRIPTION

Figure 1A:
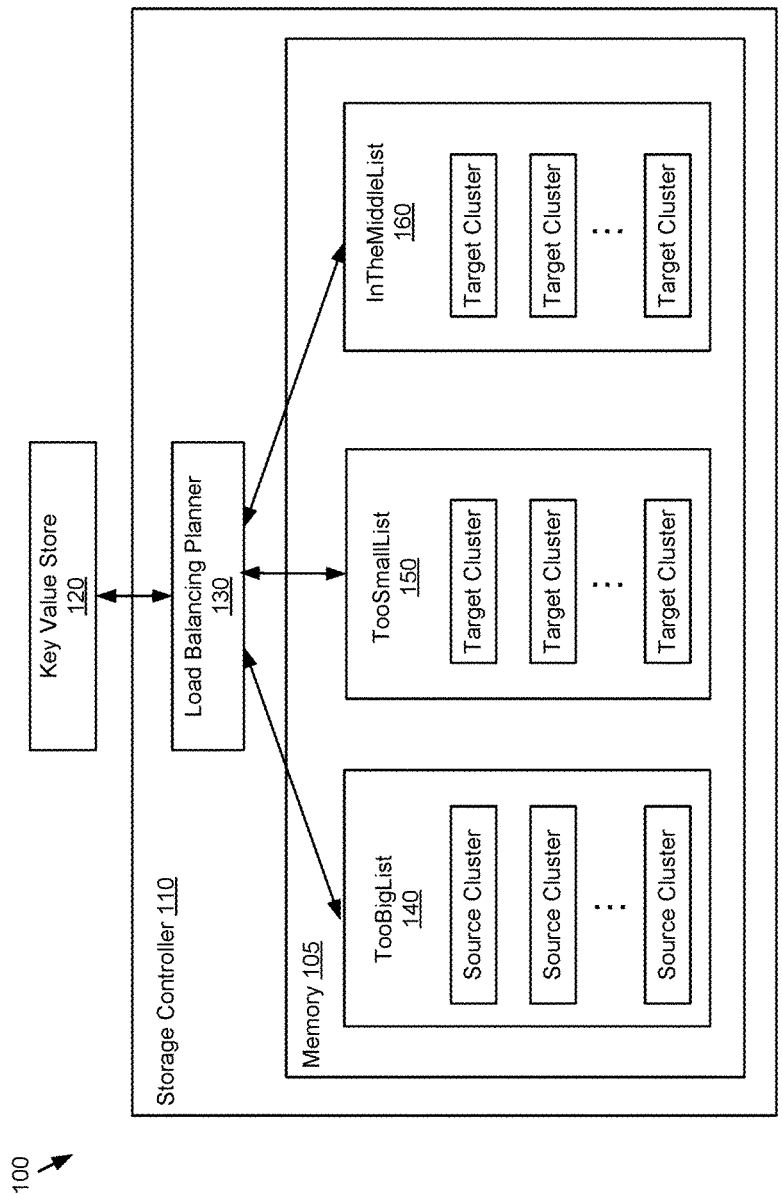
FIG. 1A schematically shows an example load distribution management system for migrating data among clusters, according to the techniques described herein.

FIG. 1A schematically shows an example load distribution management system for migrating data among clusters, according to the techniques described herein. In one embodiment, the system 100 may comprise a key value store 120. The key value store 120 may be any collection of data stored in a key-value data structure. In one example embodiment, the key value store 120 may be a sharded metadata store, where a key is a name or other identifier associated with a data object. For every key of a data object, metadata for retrieval of the data object is stored in the key value store 120. The stored metadata may include a list of storage nodes on which redundantly encoded sub blocks of the data object are available.

In one embodiment, the key value store 120 includes a plurality of clusters. For example, the key value store 120 stores up to 500 TB of metadata on 25,600 clusters of 20 GB each. Each cluster comprises two or more shards of the key value store 120. Each shard comprises metadata for an ordered key range. For example, the key ranges in an alphabetic order such as A to F, F to K, and so on. In one embodiment, a cluster may hold two or more shards of the key value store for corresponding non-adjacent key ranges. The cluster therefore corresponds to a collection of two or more non-adjacent key ranges. Non-adjacent key ranges are those key ranges that do not have a common range border. For example, a cluster storing data with a key ranges A to F and K to Q includes non-adjacent key ranges because the two key ranges do not share a range border. A key range as well as a collection of data that pertains to the key range is referred to herein as an interval. An interval may be empty if there is no data associated with the key range. The structure of the key value store 120 and intervals will be described in more detail with reference to FIGS. 1B, 1C, and 1D.

Data distribution in storage systems faces many challenges. In particular, properly redistributing data across metadata storage systems is critical as demand increases for greater performance and robustness. For example, redistributing data from a first cluster to a second cluster may improve the performance of the first cluster that was adversely affected by overloading. Even if high capacity and high-performance storage devices are used, overloading of data may result in a potential increase of latency and a decrease in throughput and reliability.

Another challenge in distributing data in a key value store, such as a sharded metadata store, is to handle defragmentation of key ranges, or intervals, to avoid the issue of granularity. Suppose that a key value store 120 includes 500 TB of data on 25,600 clusters of 20 GB and each cluster can hold a number of non-adjacent intervals. If the defragmentation of key ranges allows the 25,600 clusters to be fully interconnected, i.e., each cluster has exactly one adjacent interval with another cluster, the key value store would include 25600×(25600−1)=655 million intervals. This enormous number of intervals may cause a distribution system to malfunction or not to function at all. For example, if each routing table entry is 100 bytes and there are 655 million intervals, the size of a single routing table would be 61 GB, which is not usable. The granularity issue may become worse in unevenly distributed metadata systems, where additional latency is introduced when operating a collection of data that is unevenly divided across multiple memory cluster locations.

In the illustrated embodiment of FIG. 1A, the key value store 120 is communicatively coupled to a storage controller 110 comprising a load balancing planner 130. In another embodiment, the key value store 120 may comprise the storage controller 110 and/or the load balancing planner 130. In one embodiment, the storage controller 110 can be a controller node that manages a plurality of storage nodes including the plurality of memory clusters. In another embodiment, the storage controller 110 may be, for example, a laptop computer, a desktop computer, a tablet computer, or other electronic device with one or more processors that is configured to perform the functionality described herein. The load balancing planner 130 may be a software application running on the storage controller 110 that performs a load balancing algorithm to balance the data distribution among a plurality of memory clusters in the key value store 120.

As described above, a cluster may store one or more shards in the key value store 120 for one or more key ranges. For example, a complete key range (e.g., A-Z) may be divided into various intervals that are physically located on different clusters. An interval (e.g., A-C, D-E, etc.) comprises a collection of data that pertains to a particular key range. The load balancing planner 130 categorizes the clusters into a set of lists according to the number of intervals that each cluster contains, and stores the lists on the storage controller 110. In one embodiment, the set of lists may include a TooBigList 140, a TooSmallList 150, and a InTheMiddleList 160. The TooBigList 140 includes clusters that store too many intervals and suffer from performance issues. The clusters in the TooBigList 140 are clusters from which intervals should be removed. The TooSmallList 150 includes clusters that have capacity to store more intervals before performance issues are introduced. The clusters in the TooSmallList 150 are clusters to which intervals be added. The InTheMiddleList 160 includes clusters in which intervals do not need to be migrated unless otherwise directed by the load balancing planner 130. In one embodiment, the set of lists 140, 150, and 160 is stored on memory 105 of the storage controller 110. The memory 105 may include a random access memory (RAM) or another type of dynamic storage device for use by the load balancing planner 130. It is noted that the memory 105 stores identifiers of clusters included in each list rather than the actual clusters.

In one embodiment, the load balancing planner 130 determines which interval on a source cluster of the TooBigList 140 should be combined with one or more intervals associated with target clusters in the TooSmallList 150 and/or InTheMiddleList 160. The load balancing planner 130 enables the data migration among clusters in different lists for the purpose of evenly distributing the load in clusters of the key value store.

Figure 1B:
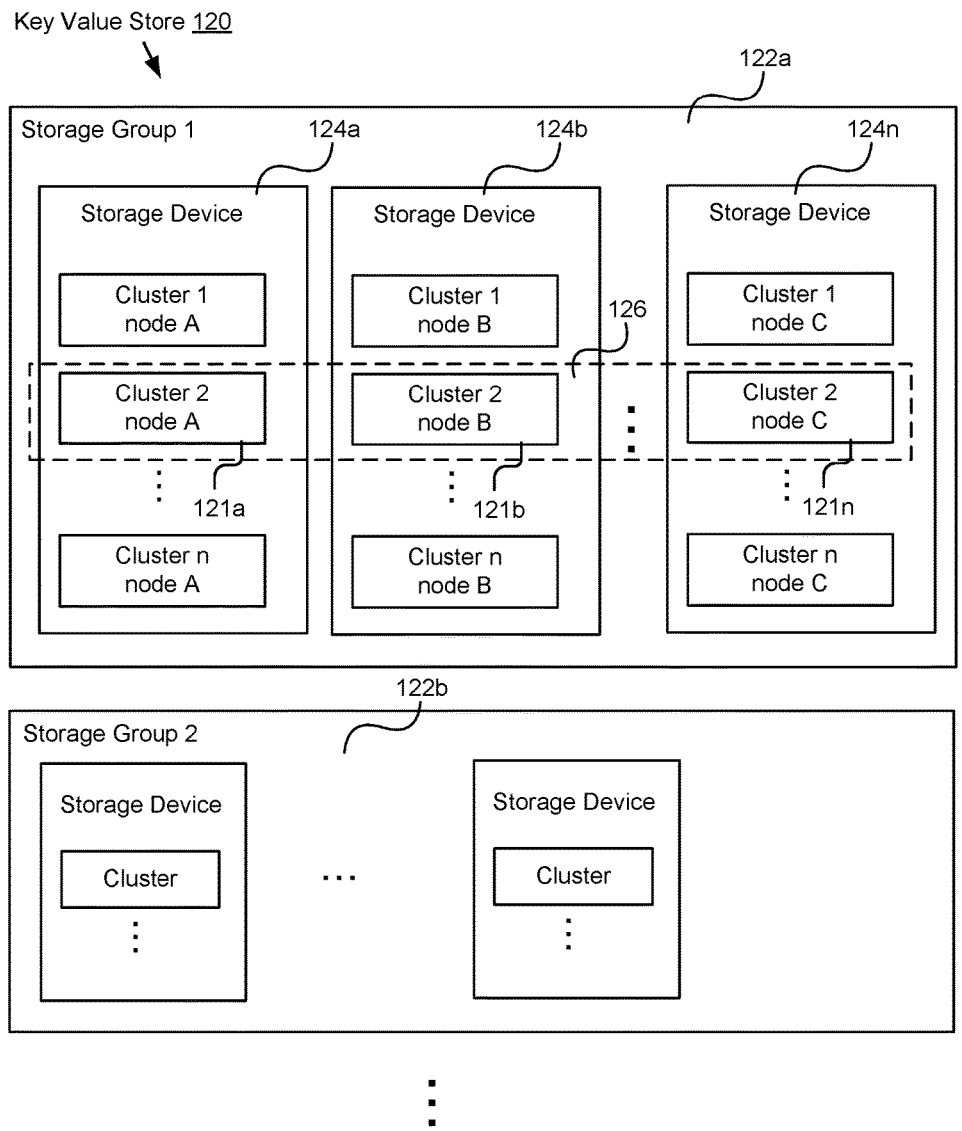
FIG. 1B schematically shows an example key value store with a number of memory clusters organized on different storage groups according to the techniques described herein.

FIG. 1B schematically shows an example key value store 120 with a number of memory clusters organized on different storage groups according to the techniques described herein. In one embodiment, the key value store 120 may include multiple storage groups 122 such as Storage Group 1 122a, Storage Group 2 122b, etc., as depicted in FIG. 1B. Each storage group includes multiple storage devices and each storage device stores a number of clusters. In the illustrated embodiment, Storage Group 1 122a of the key value store 120 includes three storage devices 124a, 124b, and 124n. In one embodiment, clusters are replicated on a storage group such that each storage device 124 of the storage group has a copy of the same cluster. In the example of FIG. 1B, each storage device 124 in Storage Group 1 122a comprises a copy of cluster 1, cluster 2, and cluster n. Cluster 2 node A 121a, Cluster 2 node B 122a, and Cluster 2 node C 121n, respectively indicate a copy of cluster 2 on storage device 124a, a copy of cluster 2 on storage device 124b, and a copy of cluster 2 on storage device 124n. These clusters represented by labels 121a, 121b, and 121c form a cluster group 126. It should be recognized by those skilled in the art that FIG. 1B only shows an example structure of a key value store. Other structures may be possible, for example, the key value store 120 may include a different number of storage devices, clusters, storage groups, etc.

Because clusters are replicated across storage devices of the cluster group, the key value store 120 stores data in a reliable way based on redundancy. This structure of a group of storage devices sharing a group of clusters provides for simplicity of the load balancing planner 130. When a group of storage devices shares a group of clusters, moving data over clusters has an equal effect on all disks of the cluster group. Further, damage to or removal of some storage devices from the key value store 120 would not affect the data migration. The data move process disclosed herein and implemented by the load balancing planner 130 works on clusters on a single storage device and/or multiple storage devices across storage groups, which avoids the situation where a single storage device becomes full and potentially blocks the entire data move process.

Figure 1C:
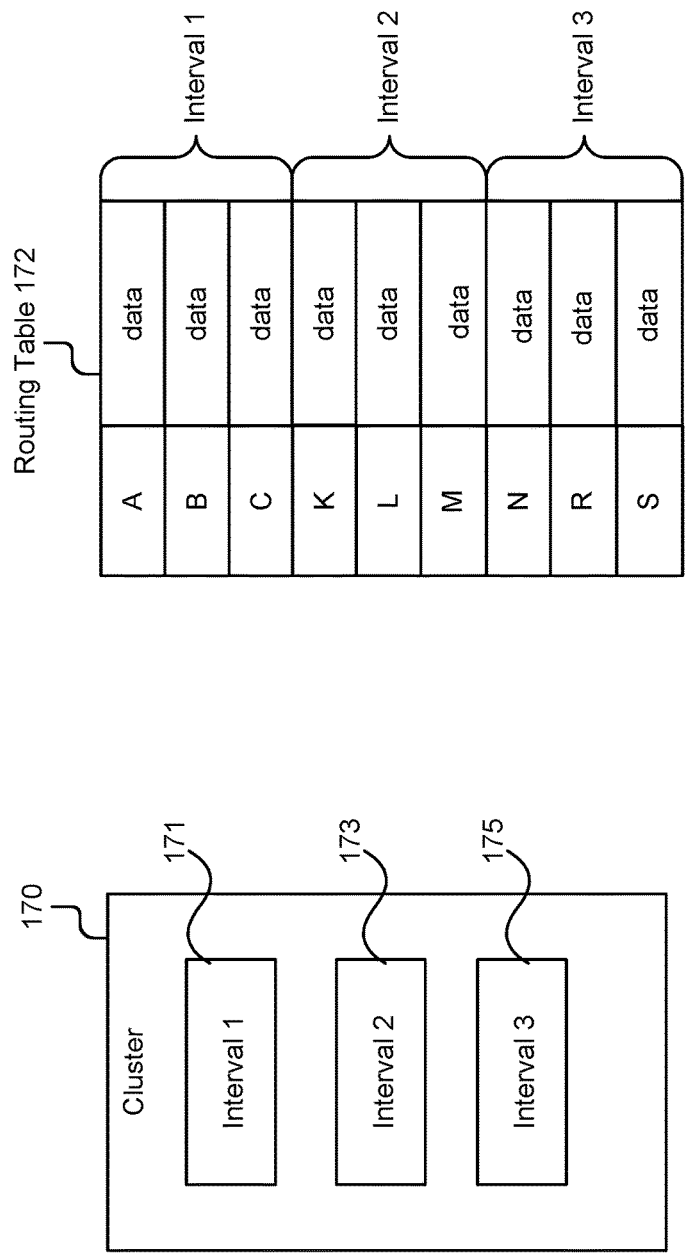
FIG. 1C is a block diagram illustrating an example cluster and a corresponding routing table according to the techniques described herein.

FIG. 1C is a block diagram illustrating an example cluster and a corresponding routing table according to the techniques described herein. The cluster 170 depicts an example cluster of the key value store 120 shown in FIG. 1B. As illustrated in the example of FIG. 1B, cluster 170 stores interval 1 171, interval 2 173, and interval 3 175. Each interval includes a collection of data that pertains to one or more key ranges. As shown in the routing table 172, interval 1 corresponds to data in key range A to C, interval 2 corresponds to data in key range K to M, and interval 3 corresponds to data in key range N and data in key range R and S.

Figure 1D:
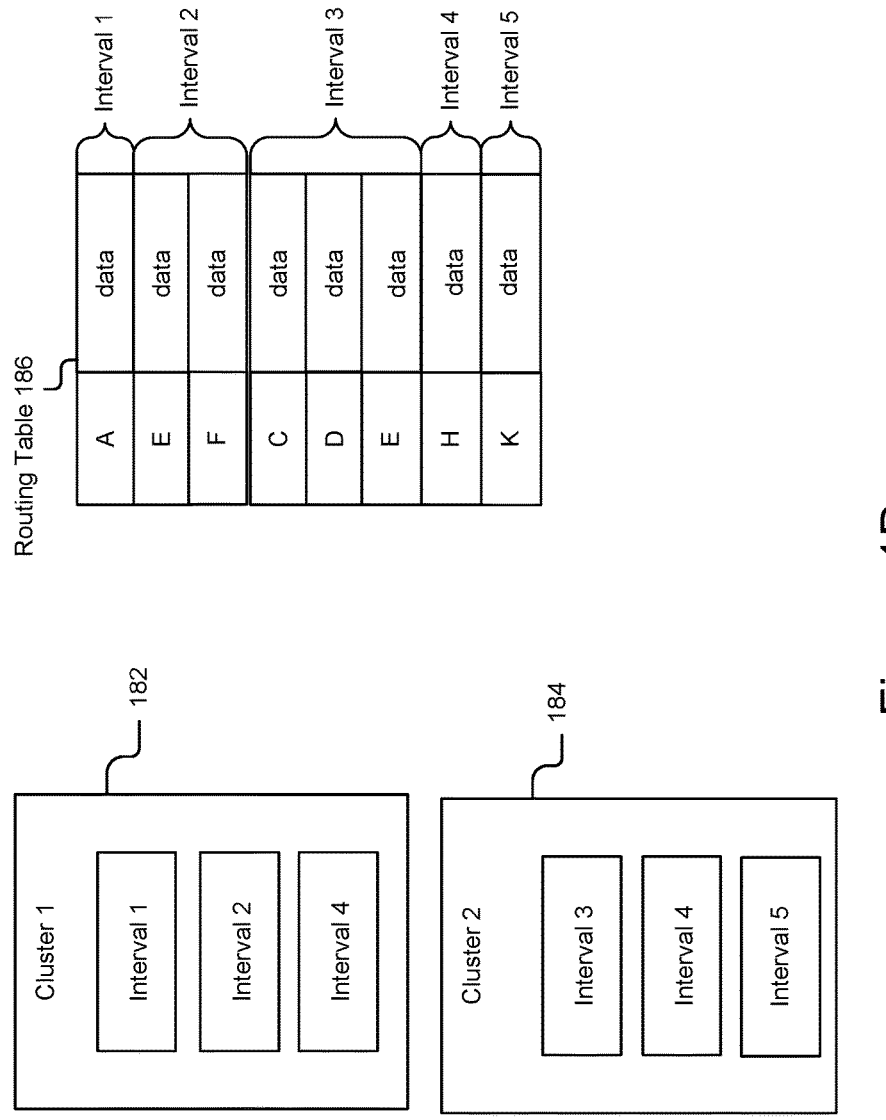
FIG. 1D is a block diagram illustrating an example of clusters across storage devices and a corresponding routing table according to the techniques described herein.

FIG. 1D is a block diagram illustrating an example of clusters across storage devices and corresponding routing tables according to the techniques described herein. In some embodiments, intervals of the key value store 120 may be stored across storage groups. For example, cluster 182 depicted in the example of FIG. 1D may be stored on storage devices on one storage group (e.g., storage group 122a depicted in FIG. 1C) and cluster 184 may be stored on another storage group (e.g., storage group 122b depicted in FIG. 1C).

Figure 2:
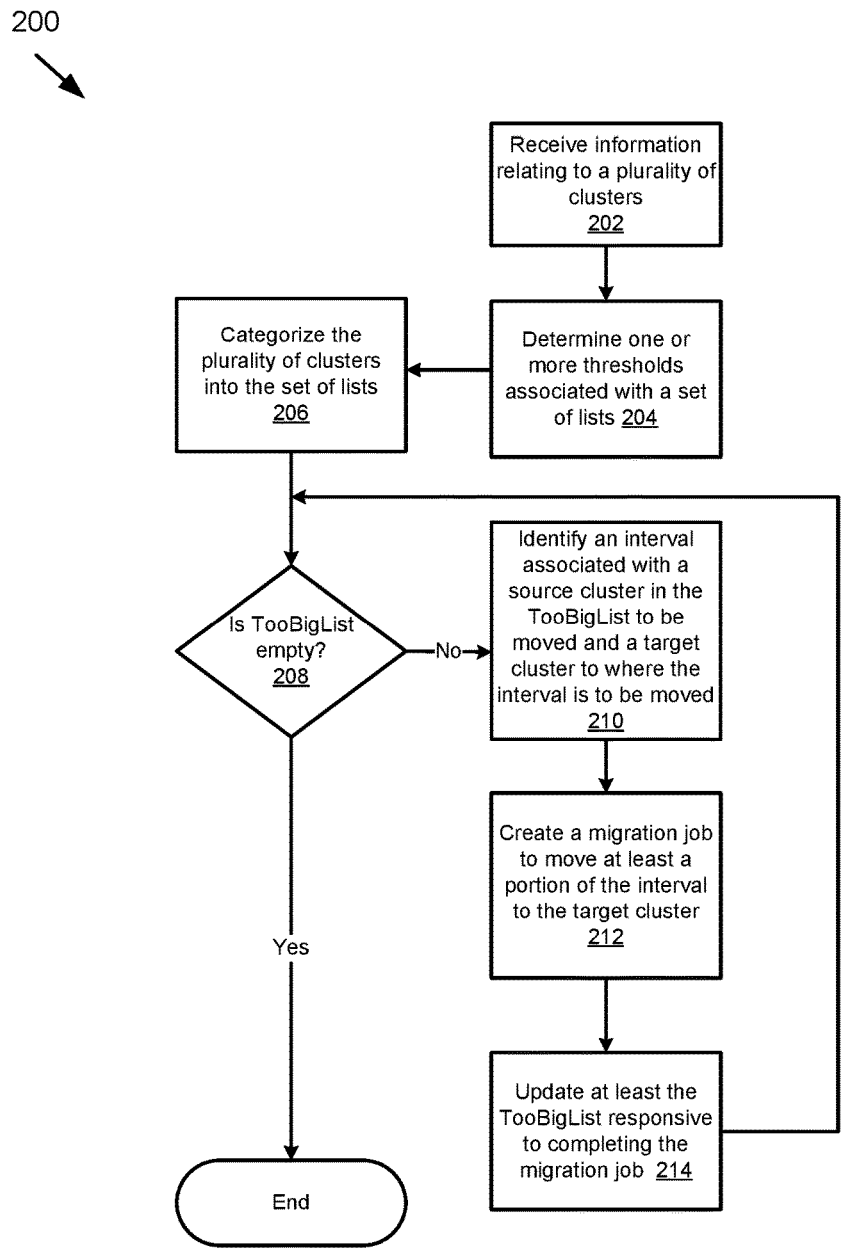
FIG. 2 is a flow chart of an example method of redistributing data from a source cluster to a target cluster, according to the techniques described herein.

FIG. 2 is a flow chart of an example method 200 for redistributing data from a source cluster to a target cluster, according to the techniques described herein. The method 200 commences when a load balancing algorithm is initiated, for example, by identifying that the available storage space of a cluster is less than a predetermined threshold, by detecting that all initial and active migration jobs have ceased, etc. Since the load balancing algorithm ensures that no cluster becomes overloaded as the clusters constantly receive migration jobs or store new data, the load balancing planner 130 may initiate this load balancing algorithm relatively frequently to keep the data distribution in the key value store 120 in balance.

At 202, the load balancing planner 130 receives information relating to a plurality of clusters of the key value store 120. For example, the load balancing planner 130 sends a request "get_size_of_all_intervals" for a first cluster to the key value store 120, and receives a sum of the lengths of keys and values for each of the intervals of the first cluster. In one embodiment, the received information includes, but is not limited to, a total number of clusters, interval(s) associated with each cluster, a total size of data of the clusters (e.g., total intervals), an average size of data of the clusters (e.g., average intervals), etc.

At 204, the load balancing planner 130 determines one or more thresholds associated with a set of lists. These lists include the clusters categorized by the load balancing planner 130. In one embodiment, the load balancing planner 130 calculate the one or more thresholds, for example, based on the average size of data of the clusters and a maximum deviation percentage. The maximum deviation percentage is a pre-set number between zero and 100. The load balancing planner 130 may reset this number based on the sizes of the lists or other factors. The load balancing planner 130 may determine an upper threshold and a lower threshold as shown below:

The upper threshold=average+(max_dev_perc/100)×average

The lower threshold=average−(max_dev_perc/100)×average where the "average" is the average size of data of the clusters and "max_dev_perc" is the maximum deviation percentage. The load balancing planner 130 considers data distribution to be in balance when the total size of data stored in each cluster is in between the lower threshold and the upper threshold. In one embodiment, the one or more thresholds determined at 204 also include a low water mark and a high-water mark, which are other data size indicators used to categorize the clusters. For example, a high-water mark value may indicate that a cluster is getting too full, e.g., the data usage exceeds 90% of the maximal capacity. When a cluster reaches the high-water mark, for example, the load balancing planner 130 schedules the cluster to be cleaned up to free up space.

At 206, the load balancing planner 130 categorizes the plurality of clusters into the set of lists. In one embodiment, the set of lists may include a TooBigList 140, a TooSmallList 150, and an InTheMiddleList 160 as depicted in FIG. 1. The load balancing planner 130 separates clusters according to the number of intervals or the data stored in each cluster. The TooBigList 140 comprises clusters that store more data (or more intervals) than the upper threshold. The TooSmallList 150 comprises clusters that store less data (or fewer intervals) than the lower threshold. The InTheMiddleList 160 comprises clusters that store an amount of data between the lower threshold and the upper threshold. In another embodiment, the TooBigList 140 comprises clusters that store more data than the upper threshold and the lower water mark.

The load balancing planner 130 migrates data away from clusters sorted into the TooBigList 140 to clusters sorted in the TooSmallList 150 to improve performance of the clusters sorted in the TooBigList 140 and balance the load of the clusters. The load balancing planner 130 continues to migrate data from clusters in the TooBigList 140 to clusters in the TooSmallList 150 until the TooBigList 140 is empty. However, in some situations, this one-step movement may not be feasible, and as such, the load balancing planner 130 uses the InTheMiddleList to help migrate data as described below with reference to FIG. 3.

At 208 the load balancing planner 130 determines whether the TooBigList 140 is empty. If the TooBigList 140 is empty, there is no need to initiate the data redistribution process, and the method 200 ends. If the TooBigList 140 is not empty the load balancing planner 130, at 210, identifies an interval associated with a source cluster in the TooBigList 140 to be moved and a target cluster to where the interval is to be moved. The details of this determination will be described below with reference to FIG. 3.

At 212, the load balancing planner 130 creates a migration job to move at least a portion of the interval to the target cluster. In one embodiment, the load balancing planner 130 creates small migration jobs frequently. The load balancing planner 130 sets up a maximum time limit for each migration job (e.g., five minutes) such that execution of a migration job does not last long enough to affect the normal system operation. The load balancing planner 130 initiates the data migration process or the method 200 as often as needed to keep the system balanced, e.g., by maintaining an empty TooBigList 140.

At 214, the load balancing planner 130 updates at least the TooBigList 140 responsive to completing the migration job. Once the migration job is finished, the data size of the source cluster (i.e. a first cluster) and the target cluster (i.e., a second cluster) get updated. Depending on the new data size of the first cluster, the load balancing planner 130 may change the first cluster from a source cluster to a target cluster, and move the first cluster from the TooBigList 140 to the InTheMiddleList 160 or the TooSmallList 150. Similarly, the load balancing planner 130 may update the TooSmallList 150 and/or the InTheMiddleList 160 based on the new data size of the second cluster.

After the load balancing planner 130 updates the set of lists at 214, the load balancing planner 130 checks 208 to determine whether the updated TooBigList 140 is empty. This procedure for displacing intervals iterates for every cluster in the TooBigList 140 until the TooBigList 140 is empty. In some embodiments, the load balancing planner 130 continuously receives information relating to clusters in the key value store 120 and updates the set of lists.

Figure 3A:
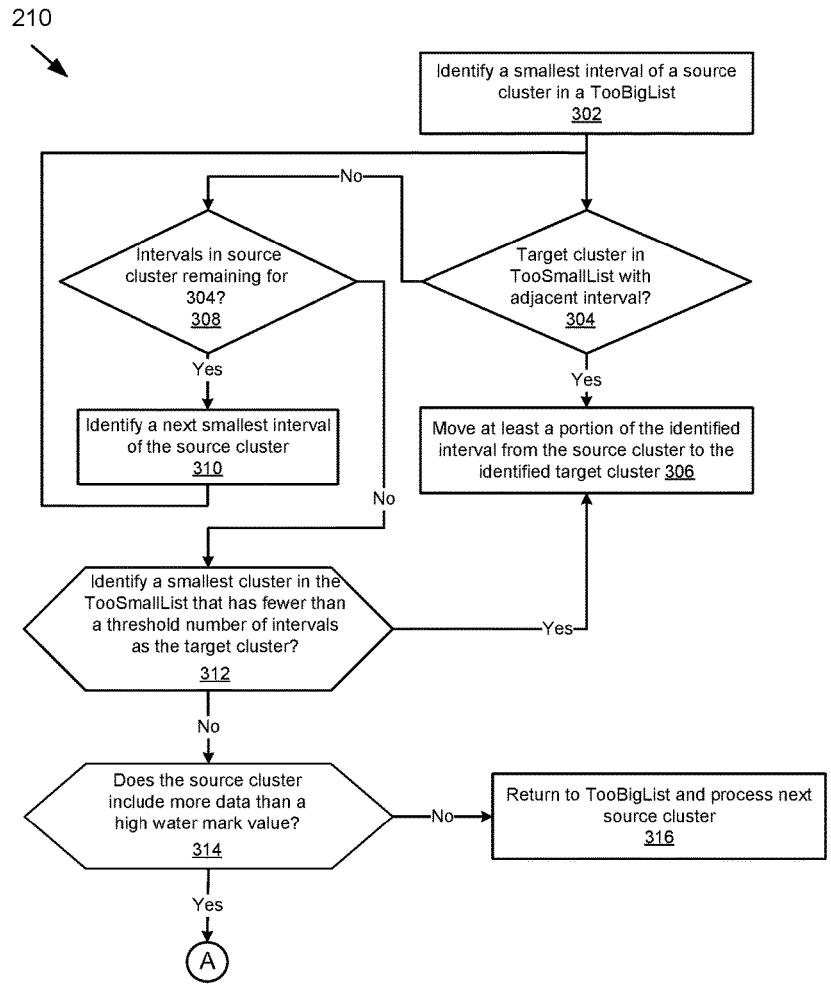
FIG. 3A is a flow chart of an example method for identifying an interval to be moved and a target cluster to which the interval is to be moved.
Figure 3B:
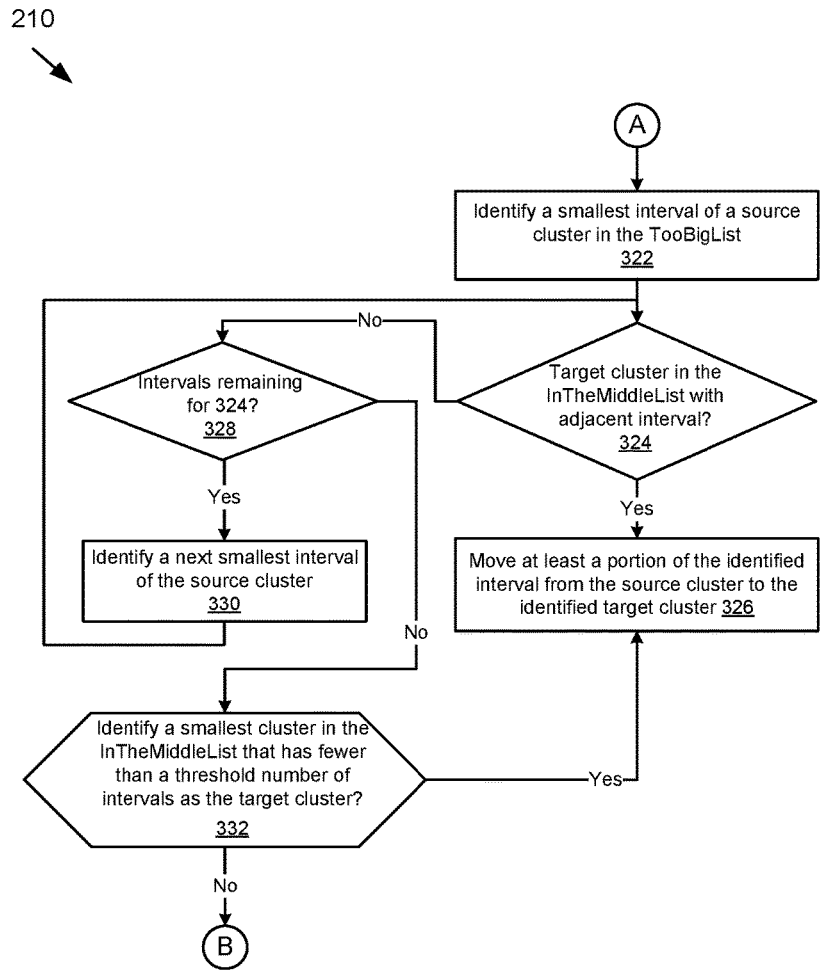
FIG. 3B is a flow chart of an example method for identifying an interval to be moved and a target cluster to which the interval is to be moved.
Figure 3C:
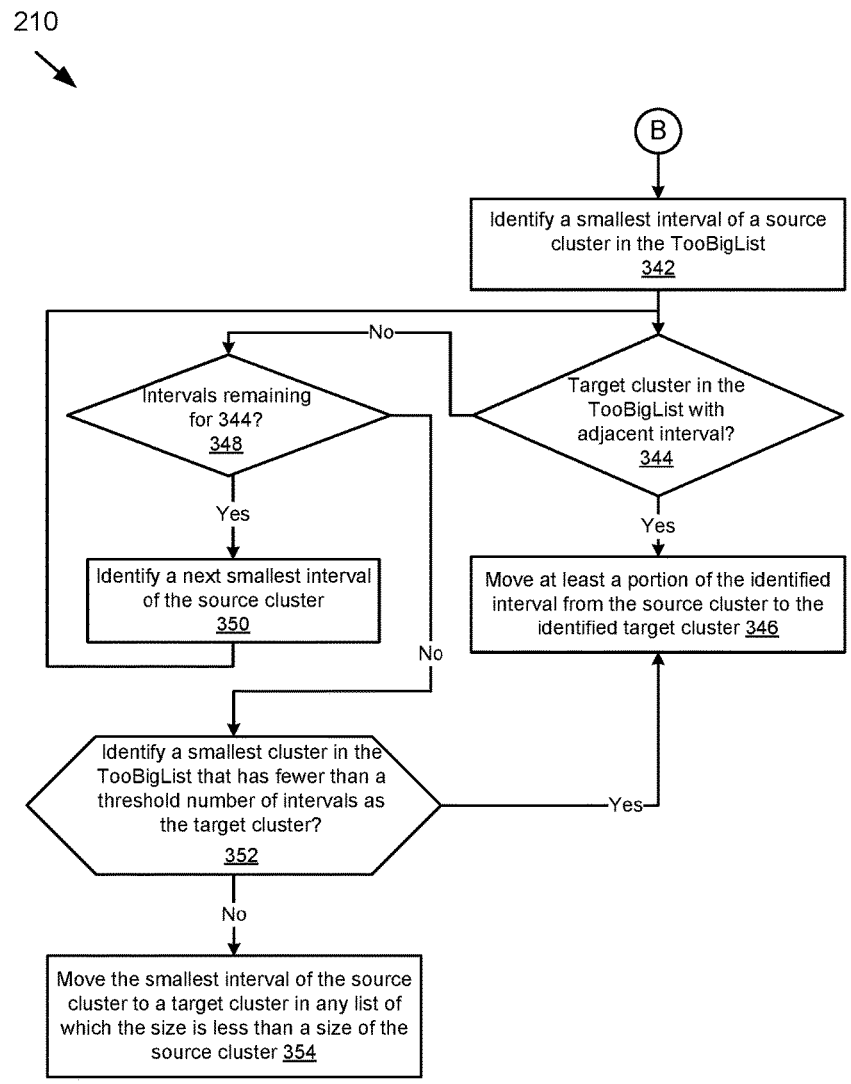
FIG. 3C is a flow chart of an example method for identifying an interval to be moved and a target cluster to which the interval is to be moved.

FIGS. 3A-3C depict a flow chart of an example method 210 for identifying an interval to be moved and a target cluster to which the interval is to be moved, according to the techniques described herein. The load balancing planner 130 applies a single load balancing algorithm to the key value store 120 to solve at least two problems. One problem solved is how to evenly distribute data, i.e., by migrating the data or intervals from the most loaded cluster to the least loaded cluster. Another problem solved is to maintain or reduce the total number of intervals of clusters, which tends to be increased due to data fragmentation produced in the data migration procedure.

In order to avoid fragmentation of the key ranges, for each source cluster in the TooBigList 140, the load balancing planner 130 may select the smallest shard of the source cluster with a key range for which there is available an adjacent key range in a target cluster of the TooSmallList, move the selected shard to the target cluster of the TooSmallList, and merge it with the shard of the adjacent key range. In this way, the load balancing algorithm decreases the overall number of non-adjacent key ranges and thus allows for an optimized routing table for the key value store 120. This portion of the load balancing algorithm corresponds to steps 302, 304, and 306 in FIG. 3.

At 302, the load balancing planner 130 identifies a smallest interval of a source cluster in the TooBigList 140 and at 304, the load balancing planner 130 determines whether a target cluster in the TooSmallList 150 includes an interval that is adjacent to the identified interval of the source cluster. Since a source cluster may have multiple intervals, the load balancing planner 130 searches, among the multiple intervals, for a smallest interval to move. In one embodiment, an interval is a smallest interval when the sum of the lengths of keys and values for this interval is the minimum among all intervals of the source cluster.

If the first target cluster with an adjacent interval exists, at 306, the load balancing planner 130 moves at least a portion of the identified interval of the source cluster to the target cluster and merges the two intervals, the adjacent interval and the moved portion of the identified interval, in the first target cluster. In one embodiment, the data movement at 306 includes creating a migration job and updating at least the TooBigList, as described above with reference to 212 and 214 of FIG. 2. Thus, a migration job is created to push the identified interval of a source cluster to a target cluster, and in the case that an adjacent interval exists in the target cluster, to merge the intervals in the target cluster. If, at 304, a target cluster in the TooSmallList with an interval adjacent to the identified interval of the target cluster does not exist, the load balancing planner 130 determines, at 308, whether there are more intervals remaining in the source cluster for 304 to check. If more intervals remain in the source cluster, the load balancing planner 130 identifies a next smallest interval of the source cluster at 310 to be the identified interval of the source cluster for the next check at 304. The process of determining whether a target cluster in the TooSmallList with an adjacent interval exists continues until either one is found, and at least a portion of the identified interval of the source cluster is moved, at 306, to the target cluster, or all of the intervals in the source cluster have been checked at 304.

At 312, after determining that no target cluster with an adjacent interval exists, the load balancing planner 130 identifies a smallest cluster in the TooSmallList that has fewer intervals than an interval threshold. The interval threshold may be, for example, 100 intervals. If a routing table entry includes 100 intervals per cluster and includes 2.5M entries, the interval threshold of 100 intervals per cluster gives a 250MB routing table per cluster, which is large but usable. Without enforcing an interval threshold per cluster, the size of the routing table can exponentially increase and result in a routing table that is too large to efficiently function. If the load balancing planner 130 identifies a target cluster in the TooSmallList with fewer intervals than the interval threshold, the load balancing planner 130 moves the identified interval (i.e., the smallest interval in the source cluster identified at 302) to the target cluster. However, since the target cluster does not include an adjacent interval, moving the identified interval to the target cluster creates a new interval in the target cluster.

If the load balancing planner 130 determines, at 312, that no target cluster in the TooSmallList has fewer intervals than the interval threshold, the load balancing planner 130 evaluates, at 314, whether the source cluster contains more data than a high-water mark value. In one embodiment, the load balancing planner 130 configures the high-water mark as an indicator that a cluster is approaching a usable capacity. For example, the high-water mark value may be 90% of the maximal capacity of a cluster. If the source cluster contains less data than the high-water mark value, the load balancing planner, at 316, postpones handling data migration of the source cluster. Instead, the load balancing planner returns to the TooBigList and processes the next source cluster. In this scenario, the load balancing planner 130 considers the high-water mark value as a second upper limit or a hard limit.

However, if the load balancing planner 130 determines at 314 that the source cluster stores data more than the high-water mark value (i.e., the source cluster is too full) the load balancing planner 130, at 322, turns to the InTheMiddleList 160 to find a target cluster for data migration from the source cluster. Using the InTheMiddleList 160, the load balancing planner 130 attempts to identify a target cluster (322-332 of FIG. 3B) following a similar process to that described above with reference to the TooSmallList 150 (302-312 of FIG. 3A). If the load balancing planner 130 does not find a suitable target cluster in the InTheMiddleList 160, at 332, the load balancing planner 130 turns to the clusters in the TooBigList 140 to find a suitable target cluster (342-352 of FIG. 3C) following a similar process to that described above with reference to the TooSmallList 150 and the InTheMiddleList 160.

At 354, if the load balancing planner 130 fails to find a suitable target cluster at 352, the load balancing planner 130 moves the smallest interval of the source cluster to a target cluster in any list of which the size is smaller than the size of the source cluster. For example, in one embodiment, the load balancing planner 130 moves the smallest interval of the source cluster to a target cluster in the smallest cluster in the TooSmallList 150 that has a size that is smaller than the source cluster.

As introduced herein, the load balancing planner 130 moves a small amount of data frequently instead of moving a large amount of data less frequently based on factors such as the data ingestion speed of a cluster. This provides an improvement over current load balancing techniques in key value stores. In one embodiment, the load balancing planner 130 sets a size limit such that no more data than the size limit can be migrated within a particular time frame, for example, within a time limit (e.g., five minutes). In one embodiment, the load balancing planner 130 determines the size limit for a migration job of (at least a part) of a selected shard or interval from a source cluster to a target cluster as a function of the size of the selected shard or interval, the difference in size between the source and target clusters (e.g., (size of source cluster-size of target cluster)/2), etc. In another embodiment, the load balancing planner 130 uses a predetermined size limit.

FIG. 4 is a block diagram 400 illustrating an embodiment of a system for implementing the techniques introduced herein. In the illustrated embodiment, the storage controller 110 includes a processor 420, a memory 430, and a data storage 440.

The storage controller 110 is communicatively coupled to the key value store 120. In some embodiments, the key value store is included in data storage 440 of the storage controller 110. The storage controller 110 includes ports for wired connectivity, for example, but not limited to USB, SD, or CAT-5, etc. In one embodiment, the storage controller 110 includes a transceiver for sending and receiving signals using Wi-Fi, Bluetooth, or cellular communications for wireless communication.

The processor 420 may include an arithmetic logic unit, a microprocessor, a general-purpose controller, or some other processor array to perform computations and provide electronic signals. The processor 420 is coupled to the bus 405 for communication with the other components. Processor 420 processes data signals and may include various computing architectures including a complex instruction set computer (CISC) architecture, a reduced instruction set computer (RISC) architecture, or an architecture implementing a combination of instruction sets. Although only a single processor is shown in FIG. 4, multiple processors may be included. Other processors and physical configurations are possible.

The memory 430 may store instruction and/or data that is executed by processor 420. The instructions and/or data may include code for performing the techniques described herein. In one embodiment, the memory 430 includes the load balancing planner 130, and the TooBigList 140, TooSmallList 150, and InTheMiddleList 160. The memory may be a dynamic random access memory (DRAM) device, a static random access memory (SRAM) device, flash memory, or some other memory device known in the art. The memory 430 is coupled to the bus 405 for communication with the other components.

In one embodiment, the data storage 440 stores data, information, and instructions used by the storage controller 110. The stored information may include information about clusters, intervals, key ranges, and other information retrieved by the processor 420. The data storage 440 can be a non-volatile memory or similar permanent storage device and media, for example, a hard disk drive, a solid-state drive, a CD-ROM device, a DVD-ROM device, a DVD-RAM device, a DVD-RW device, a flash memory device or some other mass storage device known in the art for storing information on a more permanent basis. The data storage 440 is coupled by the bus 405 for communication with the other components.

Although the techniques introduced herein have been illustrated by reference to specific embodiments, it will be apparent to those skilled in the art that the techniques are not limited to the details of the foregoing illustrative embodiments, and that the techniques may be embodied with various changes and modifications without departing from the scope thereof. The embodiments described herein are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations, or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the techniques disclosed herein are capable of operating according to the present disclosure in other sequences, or in orientations different from the one(s) described or illustrated above.

What is claimed is:
1. A computer-implemented method comprising:
creating a first list of clusters and a second list of clusters based upon a size of each cluster in the first list and the second list, wherein:
each cluster in the first list and each cluster in the second list includes at least one interval of data fragments in ordered key ranges;
the first list includes one or more clusters that store more data than an upper threshold; and
the second list includes one or more clusters that store less data than a lower threshold;
attempting to identify an adjacent target interval of a target cluster in the second list, wherein the adjacent target interval of the target cluster in the second list includes a first key range adjacent to a second key range of a source interval of a source cluster in the first list; and
responsive to identifying the adjacent target interval of the target cluster in the second list that is adjacent to the source interval of the source cluster in the first list, moving at least a portion of the source interval from the source cluster in the first list to the adjacent target interval of the target cluster in the second list, wherein the moved portion of the source interval and the adjacent target interval are combined into a single final interval.

2. The computer-implemented method of claim 1, further comprising creating a migration job to move the moved portion of the source interval from the source cluster in the first list to the single final interval of the target cluster in the second list.

3. The computer-implemented method of claim 1, further comprising:
responsive to failing to identify the adjacent target interval of the target cluster in the second list:
attempting to identify, from the second list, that a smallest cluster has fewer than a threshold number of intervals; and
responsive to identifying that the smallest cluster from the second list has fewer than the threshold number of intervals, moving the source interval from the source cluster in the first list to the smallest cluster in the second list.

4. The computer-implemented method of claim 3 further comprising:
responsive to failing to identify that the smallest cluster from the second list has fewer than the threshold number of intervals:
identifying a target cluster from a third list of clusters, wherein:
each cluster in the third list includes at least one interval of data fragments in ordered key ranges; and
the third list includes one or more clusters that have data sizes between the lower threshold and the upper threshold; and
moving the source interval from the source cluster in the first list to the target cluster in the third list.

5. The computer-implemented method of claim 1, further comprising creating a third list of clusters including one or more clusters that have data sizes between the lower threshold and the upper threshold.

6. The computer-implemented method of claim 5, wherein:
the first list includes the one or more clusters from which intervals are to be removed; and
the second list includes the one or more clusters to which intervals are to be added.

7. The computer-implemented method of claim 5, further comprising calculating the lower threshold and the upper threshold based on average number of intervals per cluster.

8. The computer-implemented method of claim 1, further comprising updating at least one of the first list and the second list responsive to moving at least the portion of the source interval from the source cluster in the first list to the target interval of the target cluster in the second list.

9. A system comprising:
a key value store configured to store a plurality of clusters of data, wherein each cluster of the plurality of clusters of data includes at least one interval of data fragments in ordered key ranges; and
a storage controller comprising:
a load balancing planner configured to:
create a first list of clusters and a second list of clusters based upon a size of each cluster in the first list and the second list, wherein:
the first list includes one or more clusters that store more data than an upper threshold; and
the second list includes one or more clusters that store less data than a lower threshold;
attempt to identify an adjacent target interval of a target cluster in the second list, wherein the adjacent target interval of the target cluster in the second list includes a first key range adjacent to a second key range of a source interval of a source cluster in the first list; and
responsive to identifying the adjacent target interval of the target cluster in the second list that is adjacent to the source interval of the source cluster in the first list, move at least a portion of the source interval from the source cluster in the first list to the adjacent target interval of the target cluster in the second list, wherein the moved portion of the source interval and the adjacent target interval are combined into a single final interval.

10. The system of claim 9, wherein the load balancing planner is further configured to create a migration job to move the moved portion of the source interval from the source cluster in the first list to the single final interval of the target cluster in the second list.

11. The system of claim 9, wherein the load balancing planner is further configured to:
responsive to failing to identify the adjacent target interval of the target cluster in the second list:
attempt to identify, from the second list, that a smallest cluster has fewer than a threshold number of intervals; and
responsive to identifying that the smallest cluster from the second list has fewer than a threshold number of intervals, move the source interval from the source cluster in the first list to the smallest cluster in the second list.

12. The system of claim 11, wherein the load balancing planner is further configured to:
responsive to failing to identify that the smallest cluster from the second list has fewer than a threshold number of intervals:
identify a target cluster from a third list of clusters, wherein:
each cluster in the third list includes at least one interval of data fragments in ordered key ranges; and
the third list includes one or more clusters that have data sizes between the lower threshold and the upper threshold; and
move the source interval from the source cluster in the first list to the target cluster in the third list.

13. The system of claim 9, wherein the load balancing planner is further configured to create a third list of clusters including one or more clusters that have data sizes between the lower threshold and the upper threshold.

14. The system of claim 13, wherein the load balancing planner is further configured to calculate the lower threshold and the upper threshold based on average number of intervals per cluster.

15. The system of claim 9, wherein the load balancing planner is further configured to update at least one of the first list and the second list responsive to moving at least the moved portion of the source interval from the source cluster in the first list to the single final interval of the target cluster in the second list.

16. A system comprising:
means for creating a first list of clusters and a second list of clusters based upon a size of each interval in the first list and the second list, wherein:

each cluster in the first list and each cluster in the second list includes at least one interval of data fragments in ordered key ranges;

the first list includes one or more clusters that store more data than an upper threshold; and the second list includes one or more clusters that store less data than a lower threshold;

means for attempting to identify an adjacent target interval of a target cluster in the second list, wherein the adjacent target interval of the target cluster in the second list includes a first key range adjacent to a second key range of a source interval of a source cluster in the first list; and responsive to identifying the adjacent target interval of the target cluster in the second list that is adjacent to the source interval of the source cluster in the first list, means for moving at least a portion of the source interval from the source cluster in the first list to the adjacent target interval of the target cluster in the second list, wherein the moved portion of the source interval and the adjacent target interval are combined into a single final interval.

17. The system of claim 16, further comprising means for creating a migration job to move the moved portion of the source interval from the source cluster in the first list to the single final interval of the target cluster in the second list.

18. The system of claim 16, further comprising:

responsive to failing to identify the adjacent target interval of the target cluster in the second list:

means for attempting to identify, from the second list, that a smallest cluster has fewer than a threshold number of intervals; and responsive to identifying that the smallest cluster from the second list has fewer than the threshold number of intervals, means for moving the source interval from the source cluster in the first list to the smallest cluster in the second list.

19. The system of claim 18, further comprising:

responsive to failing to identify that the smallest cluster from the second list has fewer than the threshold number of intervals:

means for identifying a target cluster from a third list of clusters, wherein:

each cluster in the third list includes at least one interval of data fragments in ordered key ranges; and the third list includes one or more clusters that have data sizes between the lower threshold and the upper threshold; and means for moving the source interval from the source cluster in the first list to the target cluster in the third list.

20. The system of claim 16, further comprising means for creating a third list of clusters including one or more clusters that have data sizes between the lower threshold and the upper threshold.

* * * * *